Figure 1:
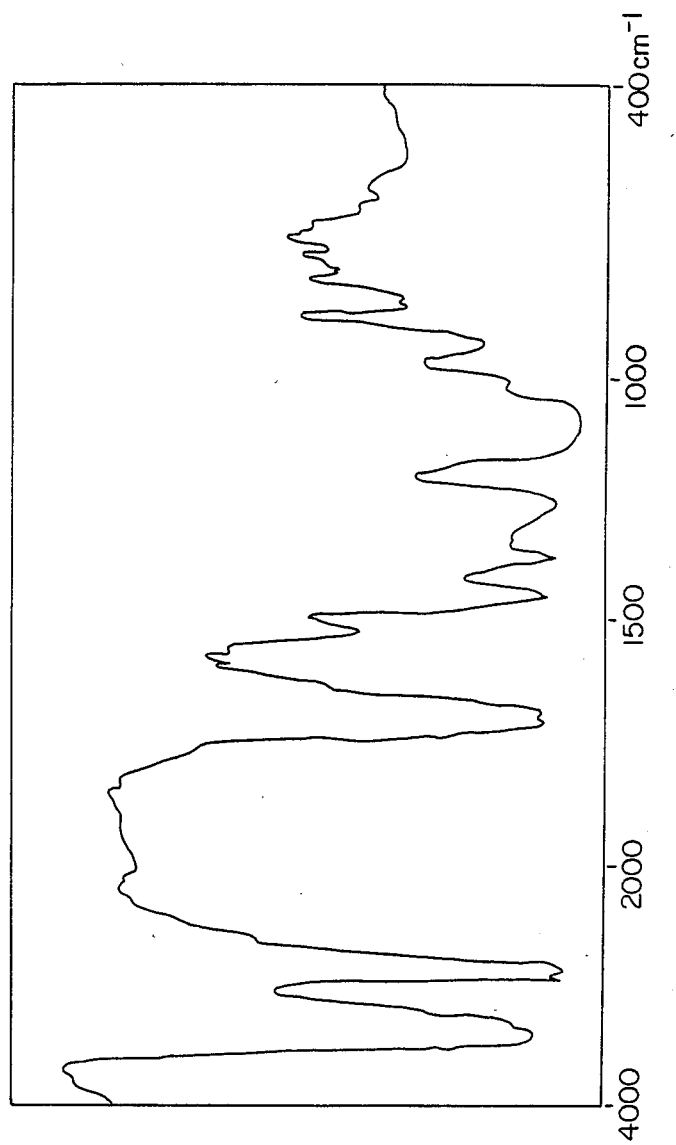

United States Patent [19]

Hirasawa et al.

[11] Patent Number: 4,556,683

[45] Date of Patent: Dec. 3, 1985

[54] PIGMENT DISPERSING RESIN AND COMPOSITION CONTAINING SAME

[75] Inventors: Yoji Hirasawa, Kyoto; Shoji Ikeda, Hirakata, both of Japan

[73] Assignee: Nippon Paint Co., Ltd., Osaka, Japan

[21] Appl. No.: 524,396

[22] Filed: Aug. 18, 1983

[30] Foreign Application Priority Data

Dec. 31, 1982 [JP] Japan ................................ 57-234171

[51] Int. Cl.$^4$ ............................................. C08L 63/00
[52] U.S. Cl. ................................ 523/447; 106/308 M; 106/308 N; 523/448; 523/455; 523/461; 523/351; 524/31; 524/100; 524/199; 524/220; 524/243; 524/290; 524/292; 524/308; 524/413; 524/420; 524/423; 524/424; 524/430; 524/432; 524/433
[58] Field of Search ............... 525/440, 443, 444.5, 525/127, 454, 453, 456; 106/308 N, 308 M; 523/447, 448, 455; 524/31, 100, 199, 220, 290, 292, 308

[56] References Cited

U.S. PATENT DOCUMENTS

| | | | |
|---|---|---|---|
| 4,129,455 | 12/1978 | Thompson et al. | 106/308 N |
| 4,186,124 | 1/1980 | Schimmel et al. | 106/308 N |
| 4,244,863 | 1/1981 | Hemmerich et al. | 523/351 |
| 4,340,699 | 7/1982 | Grouiller | 525/453 |

FOREIGN PATENT DOCUMENTS 0074080  9/1982  European Pat. Off. ........ 106/308 N

*Primary Examiner*—Lewis T. Jacobs
*Attorney, Agent, or Firm*—Wenderoth, Lind & Ponack

[57] ABSTRACT

A pigment dispersing resin which essentially consists of a modified polymer obtained by introducing at least one of acidic groups and basic groups into a polymeric polyol of star-shaped structure prepared by reacting a polyol having at least four hydroxyl groups per molecule with an epoxide, the resin being compatible with pigments and vehicle resins, and a pigment dispersed paste which comprises the pigment dispersing resin and a pigment, the pigment dispersed paste being low in viscosity over a long period of time.

10 Claims, 1 Drawing Figure

PIGMENT DISPERSING RESIN AND COMPOSITION CONTAINING SAME

The present invention relates to a resin for dispersing a pigment (hereinafter referred to as "a pigment dispersing resin"), particularly having a good compatibility with a wide variety of vehicle resins for coating compositions, a pigment dispersed paste comprising said pigment dispersing resin and a pigment, and a pigment dispersed coating composition comprising said pigment dispersed paste and a vehicle resin.

For preparation of a pigment dispersed coating composition, i.e. a coating composition comprising a pigment dispersed therein, a pigment is first mixed uniformly into a pigment dispersing resin to make a pigment dispersed paste and then the pigment dispersed paste is mixed evenly with a vehicle resin. In the above usual procedure, the pigment dispersing resin may be the same as or different from the vehicle resin. In any event, the pigment dispersing resin is required to have a good compatibility not only with the pigment but also with the vehicle resin; i.e. the pigment should be well dispersible into the pigment dispersing resin on one hand, and the pigment dispersing resin should be well blendable with the vehicle resin on the other hand. When, however, a resin different from the vehicle resin is used as the pigment dispersing resin, the compatibility between them is more or less restricted, and the choice of any suitable resin, i.e. having a better compatibility with the vehicle resin, for the pigment dispersing resin has always been necessitated. Because of this reason, it has been impossible to prepare and store a large amount of a pigment dispersed paste for general application with any vehicle resin whatever its kind may be. When a portion of a vehicle resin itself is used as the pigment dispersing resin, no care need be paid to the compatibility between the vehicle resin and the pigment dispersing resin. However, even in this case, it is not possible to prepare and store a great amount of a pigment dispersed paste for general use. After all, universal use will be realized only when a pigment dispersing resin showing a good compatibility with any of various and numerous vehicle resins is successfully provided. In addition, such pigment dispersing resin is required to have a low viscosity so that a pigment can be efficiently and uniformly dispersed therein and further the resultant pigment dispersed paste is maintained as low as possible in viscosity so as to achieve easy blending with a vehicle resin. Moreover, the pigment dispersed paste is required to have a good storage stability and should not show an increase in viscosity and loss of gloss on storage. It is extremely difficult to find a pigment dispersing resin satisfying such requirements as stated above, and in fact, a satisfactory pigment dispersing resin meeting the said requirements has never been known.

One of the present inventors succeeded previously in obtaining a polymeric polyol having a star-shaped structure by reacting a polyol having not less than 4 hydroxyl groups per molecule with an epoxide and, in view of its film-forming property and the excellent physical properties of the film formed thereby, developed the use of such polyol as the vehicle resin for a coating composition.

The said polymeric polyol of star-shaped structure is quite characteristic in having a small viscosity. However, it has been found that when the polymeric polyol is admixed with a pigment, its viscosity is rapidly increased so that the uniform dispersion of the pigment therein becomes practically impossible. It has also been found that when an acid group and/or a basic group are introduced into the polymeric polyol, the resulting modified polymeric polyol exhibits a low viscosity by itself and does not produce any rapid increase in its viscosity even when admixed with a pigment. Thus, the modified polymeric polyol can attain a good and uniform dispersion of a pigment therein with ease. Quite advantageously, the modified polymeric polyol as well as a pigment dispersed paste obtained by dispersing a pigment in the modified polymeric polyol shows a good compatibility with a wide variety of vehicle resins so that a stable and uniform pigment dispersed coating composition is readily obtainable by the use of them. Further, the pigment dispersed paste prepared by the use of the modified polymeric polyol as the pigment dispersing resin is extremely stable on storage.

As understood from the above, the technical problem underlying the present invention is how to provide a pigment dispersed paste which has a good compatibility with a wide variety of vehicle resins so that it may be prepared and stored in a large amount and blended with any vehicle resin to make a pigment dispersed coating composition for immediate use. This technical problem is solved by the use of the said modified polymeric polyol of star-shaped structure as the pigment dispersing resin according to this invention.

Still, it is known that the introduction of an acidic group and/or a basic group into a pigment dispersing resin is generally effective in enhancing the dispersibility of a pigment into the pigment dispersing resin. However, such modified resin does not, in general, have good compatibility with various vehicle resins. In addition, the modified resin is considerably increased in viscosity so that the dispersing or mixing operation with the same is quite difficult. As stated above, the modified polymeric polyol to be used in the present invention does not have such disadvantages and is not only very compatible with various vehicle resins but also exhibits a low viscosity.

According to the present invention, there is provided a pigment dispersing resin essentially consisting of a modified polymeric polyol of star-shaped structure obtained by introduction of at least one of acidic groups and basic groups into a polymeric polyol of star-shaped structure prepared by reacting a polyol having at least four hydroxyl groups per molecule with an epoxide.

There is also provided a pigment dispersing paste comprising the said pigment dispersing resin and a pigment uniformly dispersed therein.

There is further provided a pigment dispersed coating composition comprising the said pigment dispersing paste and a vehicle resin evenly blended therewith.

FIG. 1 of the drawing illustrates an IR Spectra of an examplified pigment dispersing resin.

The "polymeric polyol of star-shaped structure", as stated above, is intended to mean a polymer having a polyol molecule as the core and polymeric chains containing epoxide units and extended from the core, the number of the polymeric chains corresponding to that of the hydroxyl groups present in the polyol molecule. It can be obtained, for instance, by reacting a polyol such as a tetrol (e.g. pentaerythritol), a hexol (e.g. D-sorbitol), a monosaccharide (e.g. glucose), a disaccharide (e.g. sucrose) or a polysaccharide (e.g. starch) with an epoxide such as an alkylene oxide (e.g. ethylene oxide, propylene oxide) in the presence of an alkali metal hydroxide (e.g. potassium hydroxide, sodium hydroxide), the amount of the alkali metal hydroxide being at least 10 mol %, preferably from 10 to 20 mol % to the initiating polyol, at a temperature of 90 to 95° C. under a pressure of not more than 30 psi (absolute pressure) (Japanese Patent Publication (unexamined) No. 15933/1983 published on Jan. 29, 1983).

Each of the polymeric chains extended from the polyol molecule as the core in the said polymeric polyol has a hydroxyl group at the terminal end, and this hydroxyl group may be utilized for introduction of an acid group or a basic group therein. For instance, the reaction of the polymeric polyol with a conventional acidic or basic group-introducing agent under such a condition as making possible the progress of the reaction between the hydroxyl group(s) at the terminal position(s) of the polymeric chain(s) in the polymeric polyol and the conventional acidic or basic group-introducing agent gives a modified polymeric polyol wherein an acidic group and/or a basic group was introduced. When desired, the hydroxyl group at the terminal position of the polymeric chain may be converted previously into any other reactive group such as halo.

By the use of an acidic group-introducing agent, an acidic group is introduced. The acidic group is intended to mean an electron-accepting group, and its examples are carboxyl, sulfonyl, etc. By the use of a basic group-introducing agent, a basic group is introduced. The basic group is intended to mean an electron donating group, and its examples include a group comprising a nitrogen atom bearing a non-covalent electron pair.

As the acidic group-introducing agent, there is ordinarily employed a carboxyl group-introducing one. Specific examples are phthalic anhydride, isophthalic acid, terephthalic acid, succinic anhydride, adipic acid, azelaic acid, sebacic acid, tetrahydrophthalic anhydride, hexahydrophthalic anhydride, tetrabromophthalic anhydride, tetrachlorophthalic anhydride, chlorendic anhydride, nadic anhydride, maleic anhydride, fumaric anhydride, itaconic acid, trimellitic anhydride, methyl cyclohexene tricarboxylic anhydride, pyromellitic anhydride, etc. Among them, particularly preferred are acid anhydrides such as phthalic anhydride and maleic anhydride.

As the basic group-introducing agent, there may be employed isocyanate compounds, melamine compounds, hydroxylamine compounds, amino acid compounds, polyamide compounds, etc. Examples of the isocyanate compounds include monomeric compounds such as naphthylene diisocyanate, phenylene diisocyanate, isophorone diisocyanate, tolyl isocyanate, diphenyl ether diisocyanate, hexamethylene diisocyanate, tolylene diisocyanate, xylylene diisocyanate and diphenylmethane diisocyanate as well as high molecular compounds such as polymerized products of said monomeric compounds (e.g. hexamethylene diisocyanate series compounds such as "Dulanate EXPD-101" manufactured by Asahi Chemical Industry Co., Ltd., "Desmodur TPL-2291" manufactured by Sumitomo Bayer Co., Ltd. and "Colonate EH" manufactured by Nippon Polyurethane Co., Ltd., xylylene diisocyanate series compounds such as "Takenate D120N" manufactured by Takeda Chemical Industries, Ltd., isophorone diisocyanate series compounds such as "Desmodur Z-4370" manufactured by Sumitomo Bayer Co., Ltd.). Examples of the melamine compounds are condensates of melamine and formaldehyde in the presence or absence of alcohols such as methylated melamines (e.g "Cymel 303" and "Cymel 300" manufactured by Mitsui Toatsu Chemicals, Inc., "Sumymal 40W" manufactured by Sumitomo Chemical Co., Ltd.), n-butylated melamines (e.g. "Urban 20SE-60" manufactured by Mitsui Toatsu Chemicals, Inc.) and isobutylated melamines (e.g. "MF-013" manufactured by Nippon Paint Co., Ltd). Examples of the hydroxylamine compounds include monoethanolamine, diethanolamine, aminopentanol, aminobenzyl alcohol, 2-dimethylaminoethanol, etc. Examples of the amino acid compounds include 3-dimethyl aminobenzoic acid, 2-aminoisobutyric acid, 4-amino-n-butyric acid, etc. Among them, the use of any one chosen from the isocyanate compounds and the melamine compounds is particularly preferred.

For the reaction of the polymeric polyol of star-shaped structure with the acidic or bacic group-introducing agent, the amount of the latter to be used to 1 mole of the former is less than the molar amount corresponding to the number of the hydroxyl groups present in each molecule of the former. Preferably, the latter is used in an amount corresponding to 0.1 to 50% of the said molar amount. When an acidic group and a basic group are to be introduced, the acidic group-introducing agent and the basic group-introducing agent may be reacted sequentially to the polymeric polyol in an optional order. In this case, the total molar amount of the acidic group-introducing agent and the basic group-introducing agent may usually correspond to the number of the hydroxyl groups present in one molecule of the polymeric polyol or less. Preferably, it may be from 0.1 to 50% of the said total molar amount.

The thus obtained modified polymer is usually an oily substance, which is characteristic in having a low viscosity and can be readily blended with various pigments to make a paste wherein the pigment is evenly dispersed.

Advantageously, the thus prepared pigment dispersed paste is also characteristic in having a low viscosity, and such viscosity is not materially changed even after storage over a long period of time. In addition, the gloss such as 60° specular gloss does not change over a long period of time.

As to the scope of the pigment as can be used, no particular limitation is not present, and a variety of organic and inorganic pigments may be employed. Specific examples of the inorganic pigment are zinc oxide, titanium oxide, antimony white, iron black, red iron oxide, red lead, cadmium yellow, zinc sulfide, lithopone, barium sulfate, zinc sulfate, barium carbonate, lead white, alumina white, etc. Specific examples of the organic pigment are azo pigments, polycondensed pigments, metal complex azo pigments, benzimidzolone pigments, phthalocyanine pigments (e.g. blue, green), thioindigo pigments, anthraquinone pigments, flavanthrone pigments, indanthrene pigments, anthrapyridine pigments, pyranthrone pigments, isoindolinone pigments, perillene pigments, perinone pigments, quinacridone pigments, etc.

The amount of the pigment may be usually from 10 to 90% by weight, preferably from 30 to 70% by weight, based on the total weight of the modified polymer and the pigment.

The pigment dispersed paste of the invention comprises as the essential components the modified polymer and the pigment. When desired, any conventional additive such as resins, solvents and modifiers may be incorporated therein as the optional components insofar as no unfavorable influence is imparted to the state of of the pigment.

As stated above, the pigment dispersed paste of the invention is quite stable and can be kept on storage for a long period of time. Thus, it may be prepared in a large amount and kept for storage. When needed, it can be blended with a vehicle resin evenly to make a pigment dispersed coating composition.

As the vehicle resin, there may be used various ones, which include, for instance, oil-free polyester resins, long oil alkyd resins, short oil alkyd resins, acrylic resins, melamine resins, epoxy resins, polyurethane resins, polyamide resins, urea resins, polyether resins, etc. Still, the polymeric polyol of star-shaped structure and the modified polymer as mentioned above may themselves be used as the vehicle resin.

With respect to the proportion of the pigment dispersed paste and the vehicle resin to be incorporated, there is no particular limitation, and it may be usually from 1:99 to 99:1 by weight. When desired, appropriate resins, solvents, modifiers, etc. may be incorporated therein.

Examples of the solvent which may be incorporated into the pigment dispersed paste or the pigment dispersed coating composition are hydrocarbons (e.g. toluene, xylene, Solvesso 100, Solvesso 150), esters (e.g. ethyl acetate, butyl acetate), ketones (e.g. methylethylketone, methylisobutylketone), etc.

For preparation of the pigment dispersed paste or the pigment dispersed coating composition, any conventional mixing or blending procedure may be adopted. Examples of a mixing or blending apparatus are rolling mills, ball mills, sand grinding mills, planetary mixers, high speed dispersion mills, etc.

The thus obtained pigment dispersed coating composition can be maintain its good dispersion state over a long period of time. Further, the coating film formed by the use of such coating composition shows excellent performances. Especially, it should be noted that the content of non-volatile components (i.e. solid contents) in the pigment dispersed coating composition is much higher than that in conventional pigment dispersed coating compositions. This is particularly advantageous, because such coating composition can form a coating film having desired and favorable properties with a smaller amount of work by an easy operation. In other words, the coating composition of the invention contributes to an increase of the coating efficiency and saving of the solvent amount.

Practical and presently preferred embodiments of the present invention are illustratively shown in the following Examples wherein % is by weight.

PREPARATION EXAMPLE 1

Preparation of Pigment Dispersing Resin I

Pentaerythritol polymer (number average molecular weight (Mn)=1,019; viscosity (determined by the use of a cone plate type viscometer-Model E)=552 cp; content of non-volatile components (NV content)=100%) (200 g) and an isocyanate compound of isophorone type ("Desmodur Z-4370"; NCO content=11.5%; NV content=70%; functionality equivalent=364 g/eq.)(28.68 g) were subjected to reaction at 80° C. under nitrogen stream for 8 hours. The reaction mixture was charged in a rotary film evaporator, and the solvent was eliminated therefrom at about 80° C. under 1 mmHg for 5 hours.

To the product (100 g), phthalic anhydride (5.08 g) and dry xylene (20 ml) were added, and the resultant mixture was refluxed at 180° C. for 2 hours, whereby an addition reaction proceeded. The progress of the reaction between the hydroxyl group and phthalic anhydride was checked by measurement of the acid value on the sample taken from the reaction mixture during the reaction. After the reaction was completed, the reaction mixture was charged into a rotatory film evaporator and the solvent and the unreacted phthalic anhydride were eliminated at about 80° C. under a vacuum of 1 mmHg to give a viscous liquid (Pigment Dispersing Resin I). This liquid had the following physical properties: Mn=1146; Mw (weight average molecular weight)=2368; viscosity=5304 cp; NV content=100%; IR chart, as shown in FIG. 1 of the accompanying drawing).

EXAMPLE 1

Preparation of Pigment Dispersed Paste I

To Pigment Dispersing Resin I obtained in Preparation Example 1 (16.62 g), a white pigment "R-CR3" (titanium oxide; manufactured by Tioxide Co.) (62.10 g), isobutanol (7.20 g), butylcellosolve (7.20 g) and Solvesso 150 (8.40 g) were added, glass beads of 1 mm in diameter (120 g) were added thereto, and the resultant mixture was dispersed by the aid of a paint shaker for 20 minutes to give a pigment dispersed paste (NV content=77.5%) (Pigment Dispersed Paste I). The 60° specular gloss (measured at 10 millimicron) and the viscosity of Pigment Dispersed Paste I are shown in Table 1.

COMPARATIVE EXAMPLE A

Preparation of Pigment Dispersed Paste A

An acidic resin of short oil alkyd (Nippon Paint Co., Ltd.; NV content=60%) (90 g), melamine resin (Nippon Paint Co., Ltd.; NV content=60%) (4.5 g), xylene (4.1 g) and n-butanol (2.5 g) were heated at about 70° C. to make a viscosity of Y-Z (determined by a bubble viscometer), whereby a viscous liquid (Pigment Dispersing Resin A) was obtained. This liquid had the following physical properties: viscosity=1290 cp; Mn=2807; Mw=26515; NV content=56.0%.

Preparation of Pigment Dispersed Paste A

To Pigment Dispersing Resin A having an acidic group and a basic group as prepared above (29.68 g), a white pigment "R-CR3" (titanium oxide; manufactured by Tioxide Co.) (61.10 g), isobutanol (3.72 g), Butyl Cellosolve (3.60 g) and Solvesso 150 (4.40 g) were added, glass beads of 1 mm in diameter (120 g) were added thereto, and the resultant mixture was dispersed by the aid of a paint shaker for 20 minutes to a pigment dispersed paste (NV content=76.1%) (Pigment Dispersed Paste A). The 60° specular gloss and the viscosity of Pigment Dispersed Paste A are shown in Table 1.

The pigment dispersed pastes obtained in Preparation Example 1 and Comparative Example 1 were allowed to stand at room temperature for about 3 months and then were subjected to measurement of 60° specular gloss and viscosity. The results are shown in Table 1.

TABLE 1

| | Example 1 | | Comparative Example A | |
|---|---|---|---|---|
| | Immediately after preparation | After 3 months | Immediately after preparation | After 3 months |
| 60° specular | 78 | 85 | 37 | 37 |

TABLE 1-continued

| | Example 1 | | Comparative Example A | |
|---|---|---|---|---|
| | Immediately after preparation | After 3 months | Immediately after preparation | After 3 months |
| gloss | | | | |
| Viscosity (cp) | 119 | 101 | 832 | 1050 |

PREPARATION EXAMPLE 2

Preparation of Pigment Dispersing Resin II

Pentaerythritol polymer (Mn=1055; viscosity=323 cp; NV content=100%) (80 g) and a diisocyanate of hexamethylene type manufactured by Sumitomo-Bayer Co.; NCO content=11.5%; NV content=70%; functionality equivalent=364 g/eq.) (11.08 g) were subjected to reaction at 80° C. under nitrogen stream for 8 hours to give a pale yellow liquid (Pigment Dispersing Resin II). This liquid had the following physical properties: Mn=1648; Mw=4492; viscosity=1055 cp; NV content=100%).

EXAMPLE 2

Preparation of Pigment Dispersed Paste II

To Pigment Dispersing Resin II obtained in Preparation Example 2 (33.60 g), a black pigment "Raven 14" (carbon black; manufactured by Columbia Carbon Co.) (18.8 g), Solvesso 150 (24.8 g) and methylisobutylketone (23.7 g) were added, steel beads of 1 mm in diameter (250 g) were added thereto, and the resultant mixture was dispersed by the aid of a paint shaker for 6 hours to give a pigment dispersed paste (NV content=51.9%) (Pigment Dispersed Paste II).

COMPARATIVE EXAMPLE B

Preparation of Pigment Dispersed Paste B

To Pigment Dispersing Resin A obtained in Comparative Example A (60.0 g), a black pigment "Raven 14" (18.8 g), Solvesso 150 (13.6 g) and methylisobutylketone (12.5 g) were added, steel beads of 1 mm in diameter (250 g) were added thereto, and the resultant mixture was dispersed by the aid of a paint shaker for 6 hours to give a pigment dispersed paste (NV content=50%) (pigment Dispersed Paste B).

Pigment Dispersed Paste II was compared with that of Pigment Dispersed Paste B by 60° specular gloss. When dispersed for 6 hours, the former showed a value of nearly 80, while the latter gave a value of about 15. As to the viscosity, the former showed a value of 120 to 60 cp and the latter gave a value of 320 to 260 cp after dispersion for 1 to 6 hours.

PREPARATION EXAMPLE 3

Preparation of Pigment Dispersing Resin III

Sucrose polymer (Mn=2250; Mw=2420; viscosity=727 cp; NV content=100%) (70 g), phthalic anhydride (11.37 g) and dry xylene (20 ml) were subjected reaction at 130° C. while refluxing for 2 hours. The reaction mixture was charged into a rotary film evaporator, and the solvent and a trace of phthalic anhydride was eliminated therefrom at about 80° C. under a vacuum of 1 mmHg.

To the reaction product (70 g), a melamine compound ("Uban 20SB"; manufactured by Mitsui Toatsu Co., Ltd.) (10.5 g), formic acid (0.21 g) as the catalyst and toluene (20 ml) as the solvent were added, and the resultant mixture was heated at 115° to 120° C. for 6 hours. The reaction mixture was charged in a rotary film evaporator, and the solvent and the catalyst were eliminated at about 80° C. under a vacuum of 1 mmHg to give a viscous yellow liquid (Mn=3542; Mw=14193; viscosity=547 cp; NV content=100%) (Pigment Dispersing Resin III).

EXAMPLE 3

Preparation of Pigment Dispered Paste III

To Pigment Dispersing Resin III obtained in Preparation Example 3 (16.62 g), a white pigment "CR-95" (titanium oxide; manufactured by Ishihara Sangyo K.K.) (62.10 g), isobutanol (7.20 g), butyl cellosolve (7.20 g) and Solvesso 150 (8.40 g) were added, glass beads of 1 mm in diameter (120 g) were added thereto, and the resultant mixture was dispersed by the aid of a paint shaker for 20 minutes to give a pigment dispersed paste (NV content=77.5(Pigment Dispersed Paste III). 60° Specular gloss, 75. Viscosity, 130 cp.

COMPARATIVE EXAMPLE C

Preparation of Pigment Dispersed Paste C

In the same manner as in Comparative Example 1 but using a white pigment "CR-95" in place of a white pigment "R-CR3", there was prepared a pigment dispersed paste (NV content=76.1%) (Pigment Dispersed Paste C). 60° Specular gloss, 42. Viscosity, 780 cp.

EXAMPLE 4

Preparation of Pigment Dispersed Coating Composition I

To Pigment Dispersed Paste I obtained in Example 1 (50 g), an acidic resin of short oil alkyd (manufactured by Nippon Paint Co., Ltd.; NV content, 60%) (29.5 g), pentaerythritol polymer (Mn=1055; Mw=1238; viscosity, 323 cp; NV content=100%) (17.7 g), a melamine resin (manufactured by Nippon Paint Co., Ltd.; NV content, 60%) (13.1 g) and Solvesso 150 (11.8 g) were added, and the resultant mixture was mixed well to give a white coating composition (viscosity 127 cp; NV content=67.2%) (Pigment Dispersed Coating Composition I).

COMPARATIVE EXAMPLE 4

Preparation of Pigment Dispersed Coating Composition A

To Pigment Dispersed Paste A obtained in Comparative Example 1 (50 g), an acidic resin of short oil akyd (manufactured by Nippon Paint Co., Ltd.; NV content, 60%) (59 g) and a melamine resin (manufactured by Nippon Paint Co., Ltd.) (13.1 g) were added, and the resultant mixture was mixed well to give a white coating composition (viscosity, 1137 cp; NV content=66.6%) (Pigment Dispersed Coating Composition A).

What is claimed is:

1. A pigment dispersed paste which comprises a resin for dispersing a pigment therein, which resin consists essentially of a modified polymer obtained by introducing at least one of acidic groups and basic groups into a polymeric polyol of star-shaped structure prepared by reacting a polyol having at least four hydroxyl groups per molecule with an alkylene oxide, said acidic groups being carboxyl or sulfonic groups and said basic groupd comprising a nitrogen atom bearing a non-covalent electron pair.

2. A pigment dispersed coating composition which comprises the pigment dispersed paste according to claim 1 and a vehicle resin uniformly dispersed therein.

3. The pigment dispersed paste according to claim 1 wherein the polyol is a tetrol, a hexol, a monosaccharide, a disaccharide, or a polysaccharide.

4. The pigment dispersed paste according to claim 3 wherein the polyol is pentaerythritol, D-sorbitol, glucose, sucrose or starch.

5. The pigment dispersed paste according to claim 1 wherein said acidic groups are introduced into said polyol with a carboxylic acid or anhydride.

6. The pigment dispersed paste according to claim 5 wherein the acid group introducing agent is phthalic anhydride, isophthalic acid, terephthalic acid, succinic anhydride, adipic acid, azelaic acid, sebacic acid, tetrahydrophthalic anhydride, hexahydrophthalic anhydride, tetrabromophthalic anhydride, tetrachlorophthalic anhydride, chlorendic anhydride, nadic anhydride, maleic anhydride, fumaric anhydride, itaconic acid, trimellitic anhydride, methyl cyclohexene tricarboxylic anhydride, or pyromellitic anhydride.

7. The pigment dispersed paste according to claim 6 wherein the carboxylic acid anhydride is phthalic anhydride or maleic anhydride.

8. The pigment dispersed paste according to claim 1 wherein the basic group-introducing agent is an isocyanate, melamine, hydroxylamine, amino acid, or polyamide.

9. The pigment dispersed paste according to claim 8 wherein the basic groups are introduced with an isocyanate or melamine compound.

10. The pigment dispersed paste according to claim 1 wherein the alkalene oxide is ethylene oxide or propylene oxide.

* * * * *